(12) United States Patent
Martin et al.

(10) Patent No.: US 10,813,077 B2
(45) Date of Patent: Oct. 20, 2020

(54) COMMUNICATIONS DEVICE, INFRASTRUCTURE EQUIPMENT, COMMUNICATION SYSTEM AND METHODS FOR GROUP PAGING AND GROUPING COMMUNICATION DEVICES BASED ON VARIOUS CRITERIA

(71) Applicant: SONY CORPORATION, Tokyo (JP)

(72) Inventors: Brian Alexander Martin, Basingstoke (GB); Martin Warwick Beale, Basingstoke (GB); Shin Horng Wong, Basingstoke (GB); Shinichiro Tsuda, Basingstoke (GB)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/771,509

(22) PCT Filed: Oct. 17, 2016

(86) PCT No.: PCT/EP2016/074897
§ 371 (c)(1),
(2) Date: Apr. 27, 2018

(87) PCT Pub. No.: WO2017/076624
PCT Pub. Date: May 11, 2017

(65) Prior Publication Data
US 2019/0261310 A1    Aug. 22, 2019

(30) Foreign Application Priority Data

Nov. 6, 2015 (EP) .................................. 15193556

(51) Int. Cl.
*H04W 68/02* (2009.01)
*H04W 76/10* (2018.01)
(Continued)

(52) U.S. Cl.
CPC ....... *H04W 68/02* (2013.01); *H04W 72/0446* (2013.01); *H04W 76/10* (2018.02);
(Continued)

(58) Field of Classification Search
CPC .............................. H04W 68/02; H04W 76/10
See application file for complete search history.

(56) References Cited

U.S. PATENT DOCUMENTS 5,625,886 A * 4/1997 Raes ..................... H04W 84/08
                                                                     455/519
2009/0143072 A1 * 6/2009 Montojo ............... H04W 68/02
                                                                     455/450
(Continued)

FOREIGN PATENT DOCUMENTS

EP    1 874 070 A1    1/2008
EP    2 369 883        9/2011
(Continued)

OTHER PUBLICATIONS

International Search Report dated Dec. 12, 2016, in PCT/EP2016/074897 filed Oct. 17, 2016.
(Continued)

*Primary Examiner* — Hassan Kizou
*Assistant Examiner* — Deepa Belur
(74) *Attorney, Agent, or Firm* — Xsensus LLP

(57) ABSTRACT

An infrastructure equipment of a wireless communications network is configured when data is to be transmitted to a communications device, to transmit a control message providing an indication that the infrastructure equipment intends to transmit a paging message to the communications device, and providing an indication of communications resources of a shared channel on which the paging message is to be transmitted. The paging message includes an indication that the communications device should establish a
(Continued)

Transmission of paging records connection with the infrastructure equipment to receive the data from the infrastructure equipment. The communications device is one of a group of communications devices, configured to receive the control message, sub-divided into sub-groups of communications devices. The control message can include an indication of one of the sub-groups which should receive the paging message to be transmitted in the communications resources of the shared channel identified by the control message.

23 Claims, 9 Drawing Sheets

(51) Int. Cl.
  *H04W 72/04* (2009.01)
  *H04W 84/04* (2009.01)
(52) U.S. Cl.
  CPC ........... *H04W 84/045* (2013.01); *Y02D 70/00* (2018.01); *Y02D 70/1242* (2018.01); *Y02D 70/1262* (2018.01); *Y02D 70/21* (2018.01); *Y02D 70/24* (2018.01)

(56) References Cited

U.S. PATENT DOCUMENTS

| | | | |
|---|---|---|---|
| 2009/0280823 A1 | 11/2009 | Petrovic et al. | |
| 2010/0035633 A1 | 2/2010 | Park et al. | |
| 2010/0195579 A1* | 8/2010 | Park | H04W 74/006 370/329 |
| 2011/0312347 A1* | 12/2011 | Dinan | H04W 68/02 455/458 |
| 2013/0115977 A1* | 5/2013 | Chandramouli | H04W 4/70 455/458 |
| 2013/0184013 A1* | 7/2013 | Chao | H04W 68/025 455/458 |
| 2014/0073367 A1* | 3/2014 | Chou | H04W 4/70 455/466 |
| 2014/0079036 A1* | 3/2014 | Montojo | H04W 68/02 370/336 |
| 2014/0286222 A1* | 9/2014 | Yu | H04L 5/0037 370/312 |
| 2016/0072781 A1* | 3/2016 | Zhang | H04L 63/065 726/4 |
| 2018/0279408 A1* | 9/2018 | Jha | H04W 52/0216 |
| 2018/0288734 A1* | 10/2018 | Islam | H04W 68/005 |

FOREIGN PATENT DOCUMENTS

| | | |
|---|---|---|
| WO | WO 2009/063422 A1 | 5/2009 |
| WO | 2014153684 A1 | 10/2014 |

OTHER PUBLICATIONS

Nokia, "LS on possible power saving with paging grouping", 3GPP TSG-RAN WG2 Meeting #59bis, R2-073927, Oct. 2007, 3 pages.
Sony, "Reduction of Paging Message Reading on PDSCH.", 3GPP TSG-RAN WG2 Meeting #92, R2-156561, Nov. 2015, 4 pages.
Holma. H. et al., "LTE for UMTS OFDMA and SC-FDMA", Wiley. 2009, ISBN 978-0-470-99401-6, 8 pages.
QUALCOMM Incorporated, "New Work Item: NarrowBand IOT (NB-IOT)", 3GPP TSG RAN Meeting #69, RP-151621, Agenda Item: 14, Sep. 2015, 9 pages.
Huawei, Hisilicon, "NB-IOT—Design of Message Reading Indicator", 3GPP TSG-RAN WG2 #91 BIS, R2-154507, Agenda Item: 07.16.2.2, Oct. 2015, 4 pages.
3GPP TS 36.321 Version 12.5.0 Release 12, "LTE; Evolved Universal Terrestrial Radio Access (E-UTRA); Medium Access Control (MAC) protocol specification", Technical Specification, Apr. 2015, 79 pages.
3GPP TS 36.304 Version 12.2.0 Release 12, "LTE; Evolved Universal Terrestrial Radio Access (E-UTRA); User Equipment (UE) procedures in idle mode", Technical Specification, Sep. 2014, 39 pages.
"LTE in Wireless", Paging in LTE. [online]. http:lteinwireless.blogspot.co.uk/2012/12/paging-in-lte.html[Mar. 4, 2018, Dec. 2012. 4 pages.
European Search Report dated Mar. 19, 2019 issued in corresponding EP Application No. 16784475.2, 4 pages.
Communication Purusant to Article 94(3) EPC dated Aug. 6. 2019 in European Application No. 16784475.2.
Stefania Sesia: "LTE—The UMTS Long Term Evolution", Wiley, Chippenham, Great Britain, ISBN: 9780470660256 (Jan. 1, 2011) p. 196.
Office Action dated Mar. 11, 2020 in European Patent Application No. 16 784 475.2, 4 pages.

* cited by examiner

Transmitting a paging record in a conventional system

Transmission of paging records

Offset of PDSCH for a group depending on repetition level

COMMUNICATIONS DEVICE, INFRASTRUCTURE EQUIPMENT, COMMUNICATION SYSTEM AND METHODS FOR GROUP PAGING AND GROUPING COMMUNICATION DEVICES BASED ON VARIOUS CRITERIA

TECHNICAL FIELD OF THE DISCLOSURE

The present disclosure relates to communications devices configured to receive data from a wireless communications network. In some embodiments the wireless access interface is configured to communicate data in accordance with a plurality of repeat request-type processes. The present invention also relates to methods of communicating using communications devices, wireless communications network, infrastructure equipment and methods.

BACKGROUND OF THE DISCLOSURE

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication devices, devices which require little or no mobility, high resolution video displays and virtual reality headsets. As such there is expected to be an increase in the variety of communications devices as well as the number of devices served by a cell. Indeed, the so-called internet-of-things envisages many low power or low cost devices being used in a cell served by a base station. As such new technical problems may occur.

If there are many communications devices being served by a base station in a cell, then one problem may be to provide an arrangement in which a communications device may be paged or may detect a transmission of paging messages so that the device does not need to provide power to its receiver for a significant time.

SUMMARY OF THE DISCLOSURE

Embodiments of the present technique can provide an arrangement in which an infrastructure equipment of a wireless communications network transmits a control message providing an indication that the infrastructure equipment intends to transmit a paging message to communications devices, and providing an indication of communications resources of a shared channel on which the paging message is to be transmitted. The infrastructure equipment is configured to transmit the paging message to the communications device, the paging message including an indication that the communications device should establish a connection with the infrastructure equipment to receive the data from the infrastructure equipment. The communications device is one of a group of communications devices configured to receive the control message when the infrastructure equipment transmits the control message. The group of communications devices is sub-divided into sub-groups of communications devices and the control message is adapted to include an indication of one of the sub-groups which includes the communications device which should receive the paging message to be transmitted in the communications resources of the shared channel identified by the control message.

Embodiments of the present technique can reduce power for communications devices, which are operating in a discontinuous reception mode and only power-up their receiver when a paging occasion occurs in which a paging message is transmitted which may identify that data is to be transmitted to that communications device. This is achieved by dividing the communications devices which may be paged in the paging occasion into sub-groups and arranging for the control message, which provides the paging indication and the communications resources where the paging message will be transmitted with an identifier which identifies one of the sub-groups in which the communications device being paged forms part. Accordingly other communications devices of the group which are not in that sub-group can identify from the control message that it is not necessary to detect the paging message when the control message does not identify the sub-group for that communications device. Accordingly, their will be a power saving, because the communications devices not in that sub-group will not need to detect and decode the paging message sent for the paging occasion.

Embodiments according to another aspect of the present technique an infrastructure equipment of a wireless communications network transmits a control message providing an indication that the infrastructure equipment intends to transmit a paging message to communications devices, and providing an indication of communications resources of a shared channel on which the paging message is to be transmitted. The infrastructure equipment is configured to transmit the paging message to the communications device, the paging message including an indication that the communications device should establish a connection with the infrastructure equipment to receive the data from the infrastructure equipment. The communications device is one of a group of communications devices configured to receive the control message when transmitted by the infrastructure equipment, and the group of communications devices is sub-divided into sub-groups of communications devices. Each of a plurality of the sub-groups is configured to identify from the control message an indication of different communications resources of the shared channel in which a different paging message is to be transmitted for reception by the communications devices in the sub-group of the communications devices, each of the paging message identifying one or more communications devices of the sub-group which are to receive data from the infrastructure equipment on the downlink.

Embodiments of the present technique can therefore provide an arrangement in which each of a plurality of different sub-groups of communications devices can receive a different paging message in different communications resources which are identified for each sub-group in the same control message. As such each of the paging messages transmitted for the sub-groups can be adapted in accordance with a type communications device or a characteristic of communications with that communications device. In one example the control message is adapted to include, for each of the plurality of the sub-groups, information indicating the communications resources of the shared channel from which the paging message for that sub-group can be received. In another example, the each of the communications devices in each of the plurality of the sub-groups is configured to identify the communications resources of the shared channel from which the paging message for that sub-group can be received from the control message, by, for example, applying a predetermined offset from the control message to point to the communications resources of its paging message. Various further aspects and embodiments of the disclosure are provided in the appended claims, including but not limited to, a communications device, infrastructure equipment, mobile communications system and a method of communicating.

BRIEF DESCRIPTION OF DRAWINGS

Embodiments of the present disclosure will now be described by way of example only with reference to the accompanying drawings in which like parts are provided with corresponding reference numerals and in which.

DESCRIPTION OF EXAMPLE EMBODIMENTS

Conventional LTE Network

Figure 1:
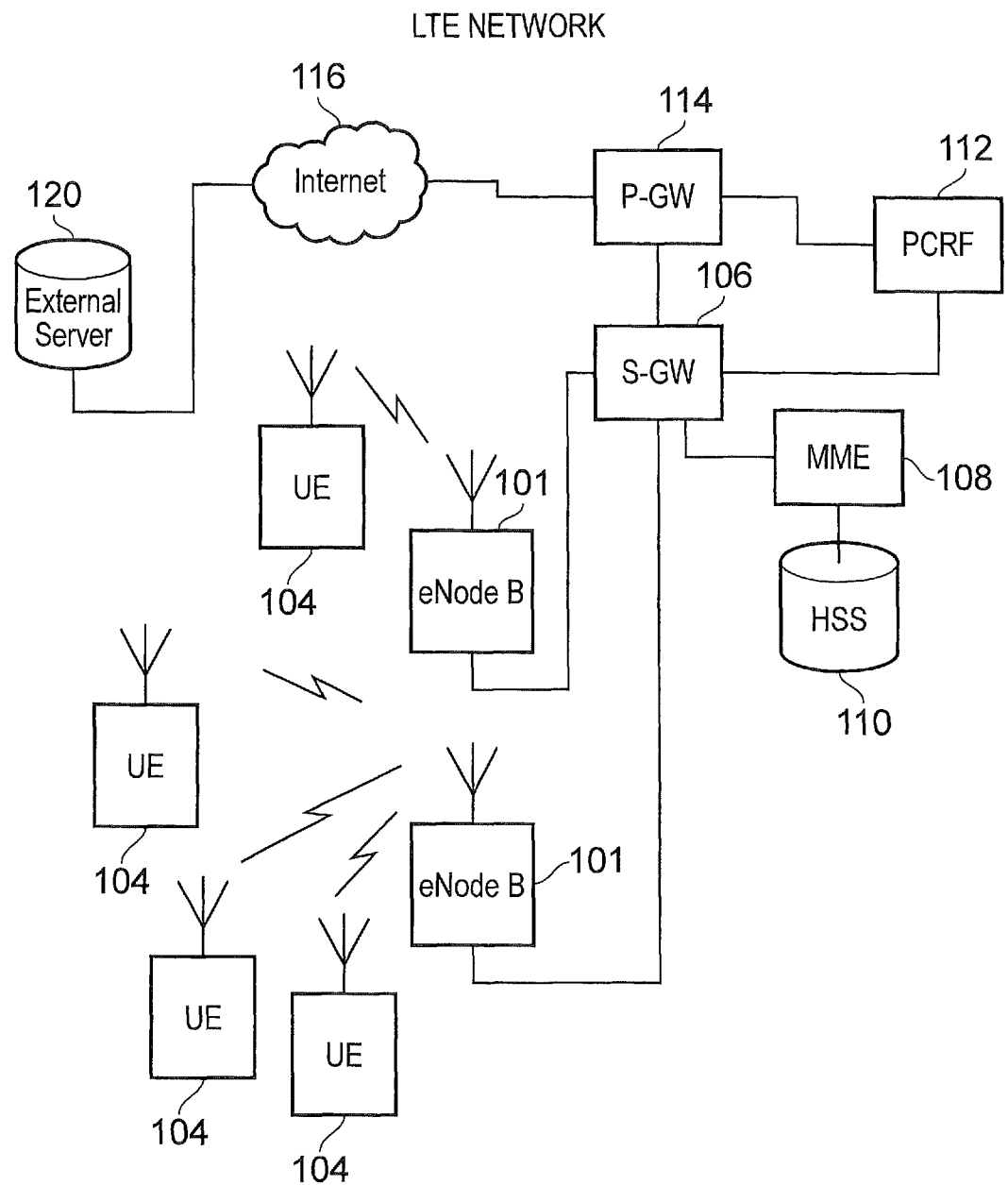
FIG. 1 provides a schematic diagram illustrating an example of a conventional mobile communications system.

FIG. 1 provides a schematic diagram illustrating some basic functionality of a mobile telecommunications network/system operating in accordance with LTE principles. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The mobile telecommunications system, where the system shown in FIG. 1 includes infrastructure equipment including base stations 101. The infrastructure equipment 101 may also be referred to as a base station, network element, enhanced NodeB (eNB (eNB)) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface. The core network 102 may also provide functionality including authentication, mobility management, charging and so on for the communications devices served by the network entity.

The mobile communications devices 104 of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links.

As shown in FIG. 1 eNB's 101 are connected to a serving gateway S-GW 106 which is arranged to perform routing and management of mobile communications services to the communications devices 104 as they roam throughout the mobile radio network. In order to maintain mobility management and connectivity, a mobility management entity (MME) 108 manages the enhanced packet service (EPS) connections with the communications devices 104 using subscriber information stored in a home subscriber server (HSS) 110. Other core network components include the policy charging and resource function (PCRF) 112 a packet data gateway (P-GW) 114 which connects to an internet network 116 and finally to an external server 120. More information may be gathered for the LTE architecture from the book entitled "*LTE for UMTS OFDN and SC-FDNA based radio access*", Holma H. and Toskala A. page 25 ff.

LTE Wireless Access Interface

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 2 and 3.

Figure 2:
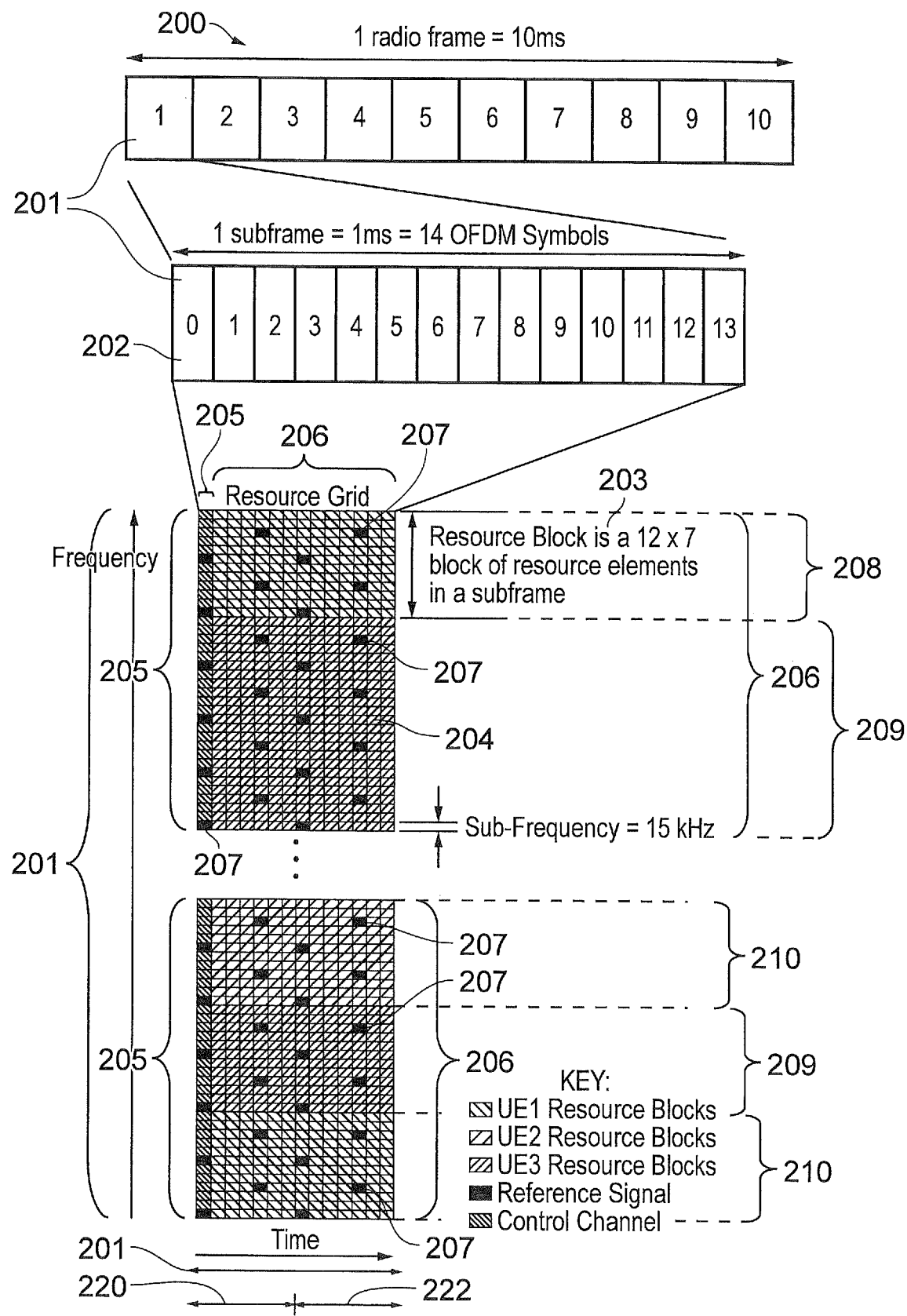
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used for features such as the cyclic prefix of the OFDM symbols). The number of subcarriers varies between 72 subcarriers (1.4 MHz) and 1200 subcarriers (20 MHz). In some examples the subcarriers are grouped on a basis of $2^n$, for example 128 to 2048, so that both a transmitter and a receiver can use an inverse and a forward Fast Fourier Transform to convert the subcarriers from the frequency domain to the time domain and from the time domain to the frequency domain respectively. Each subcarrier bandwidth may take any value but in LTE it is fixed at 15 kHz.

As shown in FIG. 2, the resources of the wireless access interface are also temporally divided into frames where a frame 200 lasts 10 ms and is subdivided into 10 sub-frames 201 each within a duration of 1 ms. Each sub-frame 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. The resource elements distributed in time within a sub-frame and frequency across the host system band width represent the communications resources of the host system.

The simplified structure of the downlink of an LTE wireless access interface presented in FIG. 2, also includes an illustration of each sub-frame 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure ePDCCH and PDSCH are most relevant. Further information on the structure and functioning of the physical channels of LTE systems can be found in [1].

Figure 3:
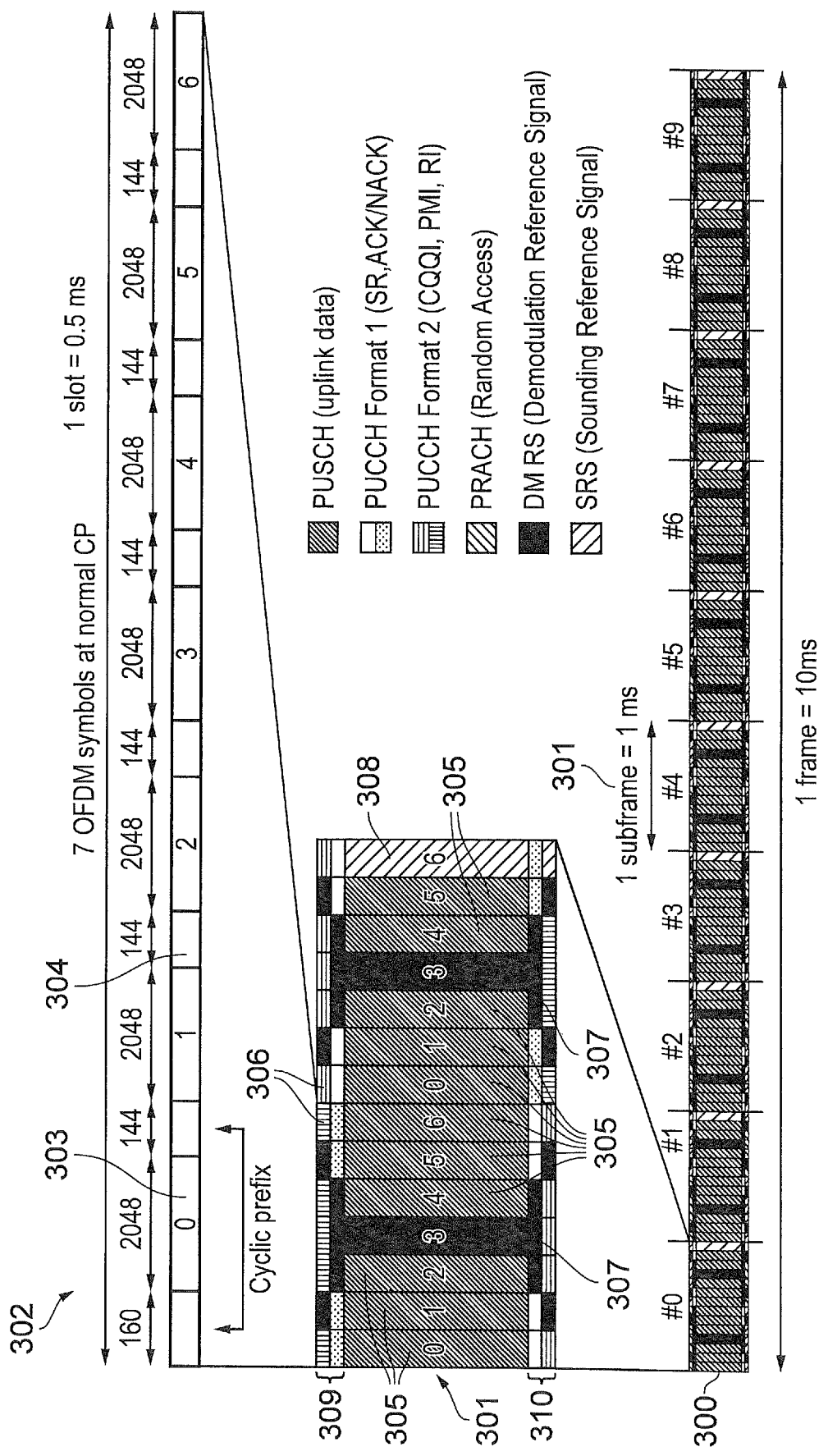
FIG. 3 provides a schematic diagram of an uplink of a wireless access interface of a mobile communications system operating according to an LTE standard.

Resources within the PDSCH may be allocated by an eNB to UEs being served by the eNB. For example, a number of resource blocks of the PDSCH may be allocated to a UE in order that it may receive data that it had previously requested or data which is being pushed to it by the eNB, such as radio resource control (RRC) signaling. In FIG. 3, UE1 has been allocated resources 208 of the data region 206, UE2 resources 209 and UE3 resources 210. UEs in an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

Figure 4:
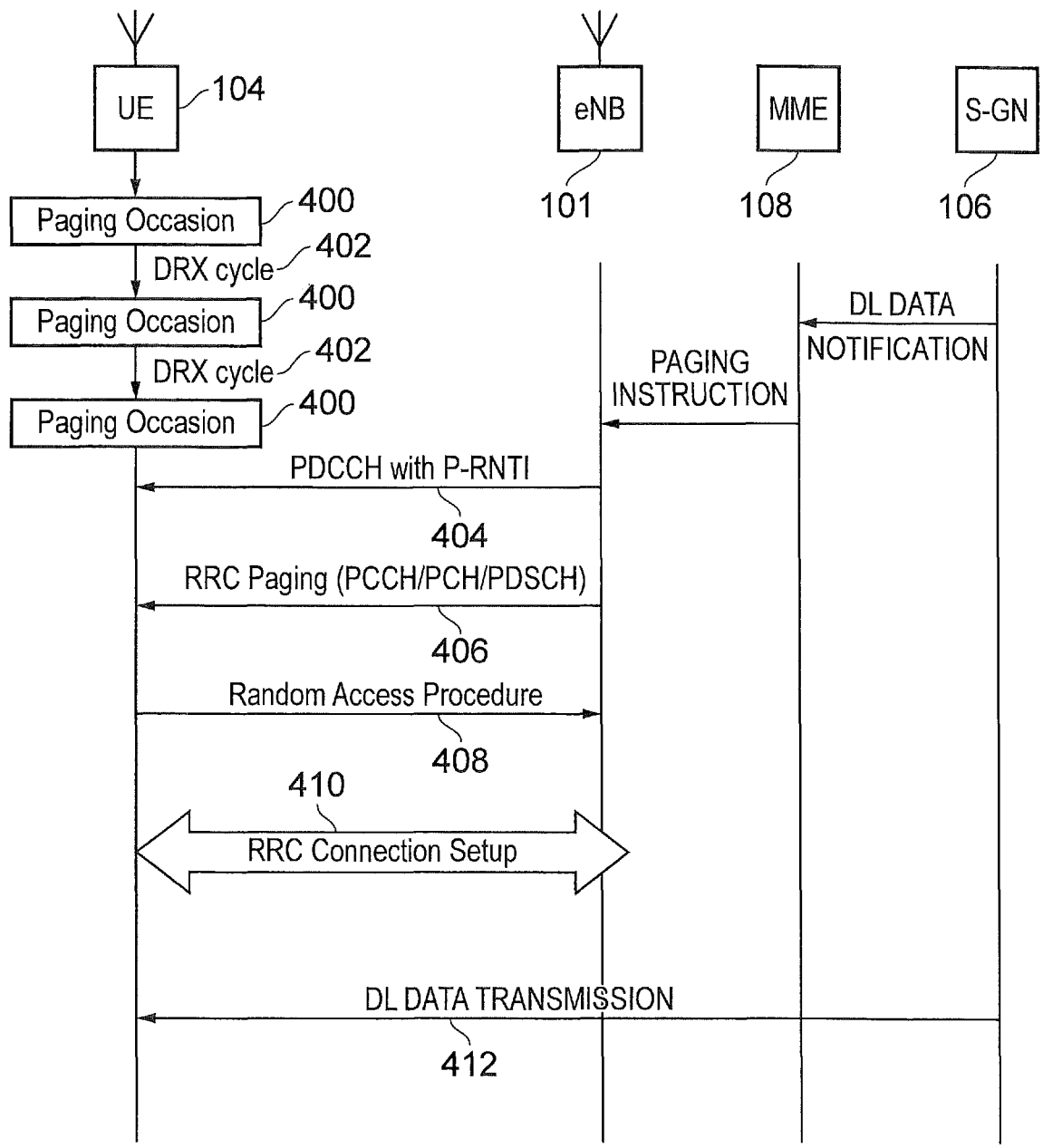
FIG. 4 provides a message sequence diagram and part schematic diagram providing a simplified representation of a paging procedure for a conventional system.

FIG. 3 provides a simplified schematic diagram of the structure of an uplink of an LTE wireless access interface that may be provided by or in association with the eNB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 4 illustrates such an uplink frame in an FDD implementation. A frame 300 is divided in to 10 sub-frames 301 of 1 ms duration where each sub-frame 301 comprises two slots 302 of 0.5 ms duration. Each slot is then formed from seven OFDM symbols 303 where a cyclic prefix 304 is inserted between each symbol in a manner equivalent to that in downlink sub-frames. More details of the LTE up-link represented in FIG. 3 are provided in Annex 1.

Downlink Data Transmission

To transmit data to a communications device (UE), it is necessary to locate a UE within a wireless communications network and to establish a connection with the UE for transmitting the data to the UE. A process for establishing a connection with a UE includes a paging procedure, which informs the UE that the network has data to transmit to it so that the UE should enter an active state and establish a connection. To this end, a paging message is transmitted to the UE as part of the paging procedure. A summary of the paging procedure for LTE can be found in [2].

FIG. 4 provides a simplified representation of a paging procedure according to that which is currently proposed within LTE. As shown in FIG. 4 paging occurs when data is to be transmitted to a UE 104 on the downlink. The data is received at the network and forwarded to the serving gateway 106. The serving gateway 106 then sends a downlink data notification that it has downlink data to send to a UE to the MME 108. As explained above the MME 108 is responsible for mobility management for the UEs and therefore is aware of a current location of each UE within an area comprising a plurality of eNBs. The MME 108 then sends a paging instruction to a group of eNBs in the area in which the UE is located, including the eNB 101 to which the UE 104 is currently attached. The eNB 101 then proceeds to transmit a paging message to the UE.

As those acquainted with LTE will appreciate the LTE standard provides a technique in which UEs can perform discontinuous reception (DRX) in order to save battery power. Discontinuous reception allows the UE to reduce power to its receiver because according to the system specification a paging message will not be sent to a UE for a predetermined time. However, according to the specification the UEs are configured to "wakeup" and power up its receiver at each paging occasion in order to receive a paging message which may be transmitted to the UE from an eNB. The time at which a UE wakes up and powers up its receiver to receive a paging message from the eNB is referred to as a "paging occasion". Thus as shown in FIG. 4 the UE 104 periodically powers up its receiver at the predetermined paging occasions 400. As also shown in between, the UE powers down its receiver according to its DRX cycle 402. Likewise the eNB will only transmit a paging message for that UE in the paging occasions 400 for that UE.

In addition to reducing power consumption, the arrangement of paging occasions can also to manage congestion for communicating with the UE on the downlink. This is because the UEs within a cell which is served by a base station are divided into different groups and each group is assigned a different time to activate its receiver to receive a paging message and correspondingly the eNB only transmits paging messages for that group at that time. This time for each group of UEs is known as a paging occasion. The paging occasion for each UE is specified and predetermined for the system as a function of the UE's unique identifier (international mobile subscriber identity number (IMSI)) and a time frame of the wireless access interface. For the example of LTE, calculation of paging occasions is disclosed in 3GPP TS 36.304 [3] at section 7.1.

As shown in FIG. 4 when a paging occasion occurs for the UE, the eNB 101 transmits in the PDCCH for the UE a paging identifier known as a paging-radio network temporary identifier (P-RNTI). The UE receives the P-RNTI from the PDCCH which also provides an indication of the communications resources of for example the shared channel (PCCH/PCH/PDSCH) in which the paging message will be transmitted. Therefore at step 406 the eNB 101 transmits an RRC paging message within the communications resources of the PDSCH, which have been indicated by the PDCCH in message 404. If the UE 104 detects an identifier of that UE which is received within the paging message transmitted on the shared communications resources (PDSCH) 406, then the UE 104 performs a random access procedure 408 in order to request downlink communications resources from the eNB 101. There then follows an RRC connection setup exchange of messages 410 which establishes an RRC connection with the UE 104 so that the downlink data can be transmitted to the UE in communications represented by an arrow 412.

Figure 5:
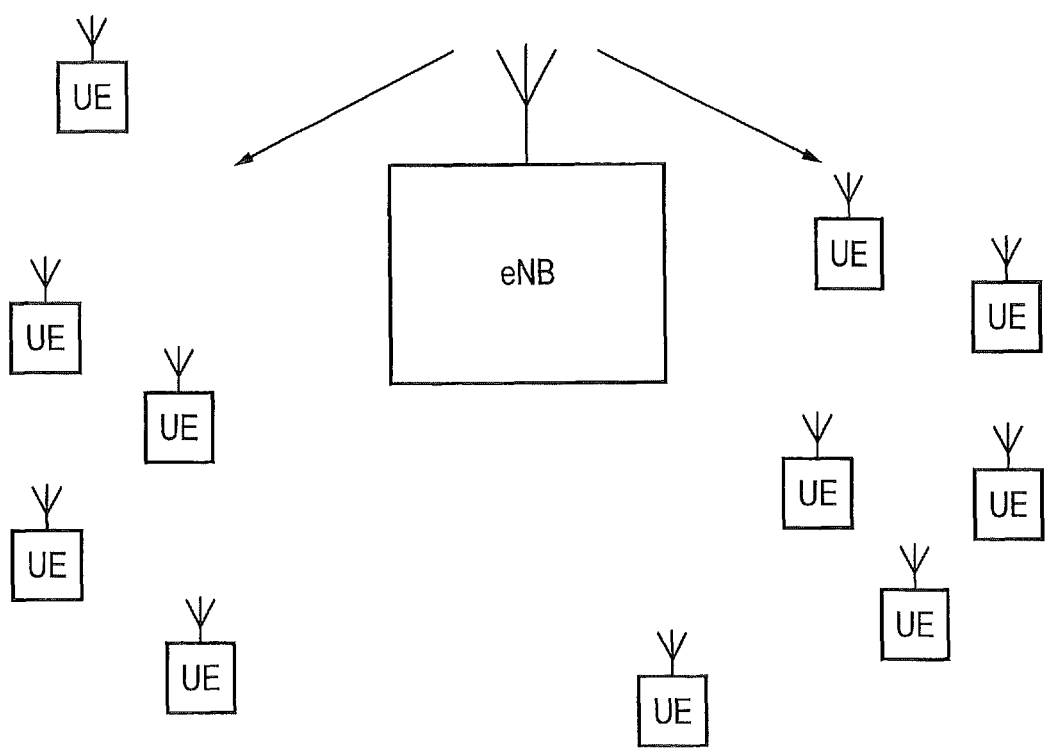
FIG. 5 schematic representation of a plurality of communications devices being served by a base station.

As will be appreciated in future there is likely to be an increased number of UEs of various types within a coverage area of an eNB. It has also been proposed that very low power devices may be used to form what is known as an internet of things (IOT) [4]. Accordingly there may be many communications devices 104 which are being served by an eNB 101 such as shown in FIG. 5. If every UE 104 must power up its receiver in accordance with the paging occasions in order to receive the downlink paging message in the shared channel resources only to discover that the paging message is not for the UE because the paging message does not identify the UE, then this would represent a considerable waste of power particularly for devices which are only communicating very occasionally. Currently there is no grouping in one paging occasion. A known arrangement disclosed in [5] proposes to create some grouping of UEs, so that some UEs do not have to wake up and read the PDSCH. The proposal is to divided the UEs in the cell served by the eNB into a plurality of groups by transmitting signaling information to the UEs in the cell on a broadcast channel (MIB). The signaling information provides an indication to the UEs in a group for which a conventional paging procedure is to be performed at the next paging occasion.

The intention of the proposal disclosed in [5] is to reduce an amount of UEs that need to wake up in response to detection of P-RNTI in PDCCH and read PDSCH to retrieve the paging C-RNTI which determines whether a paging message is addressed to that particular UE or not. The existing calculation of paging occasions (POs) ensures already that only a subset of UEs (which have that particular paging occasion) wake up when P-RNTI is decoded. The intention is to reduce the number of UEs that proceed to the PDSCH decoding stage, which is currently all UEs for that paging occasion. However this proposal disclosed in [5] suffers a number of drawbacks, which are 1. The proposal introduces new bits in a "message reading indicator" which all UEs in that paging occasion would need to decode.
2. The "message reading indicator" is sent in broadcast information (NUB), which means that the UE would anyway need to receive PBCH (albeit a potentially shorter message). This means that the savings would be minimal.
3. It is not clear how to group UEs. For example if all UEs of a particular type such as smart meters were in one group, then the solution helps to conserve smart meter power when another type of device is paged, but does not help to conserve power within this group of devices, because all smart meters would need to wake up whenever one is paged.

First Examples of an Improved Paging Technique

Embodiments of the present technique can provide an arrangement in which UEs are further grouped into sub-groups by using a different identifier for each sub-group in the PDCCH transmission of the paging message (multiple P-RNTIs) instead of a separate message reading indicator. Furthermore identifier which identifies the sub-group (P-RNTI) sent on the PDCCH indicates which sub-group or sub-groups of UEs are included in the paging record list provided in the paging message sent on the PCH or PDSCH resources, as such only UEs which detect a specific sub-group identifier (P-RNTI) then proceed to receive the paging message on the PCH or PDSCH, and/or the sub-group identifier (P-RNTI) can refer to a sub-group using a function of UE-identity, or alternatively by pre-assigning certain UEs to particular P-RNTIs.

Figure 6:
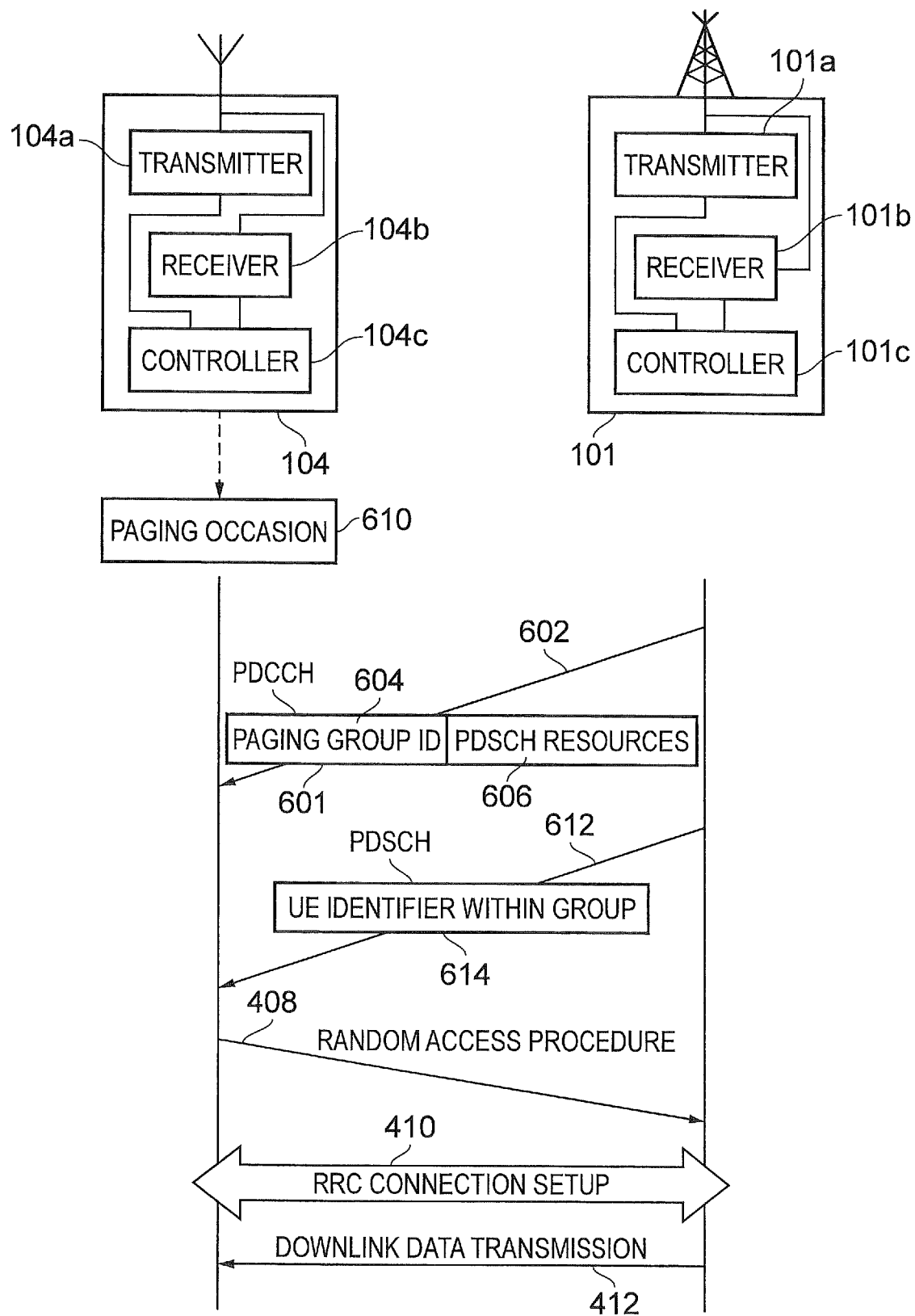
FIG. 6 is a message flow diagram part block diagram illustrating an embodiment of the present technique in which a paging procedure is adapted to page subgroups of communications devices.

Embodiments of the present technique can be appreciated in one example from the message flow arrangement shown in FIG. 6. In FIG. 6 a simplified representation of features of an eNB 101 are shown to include a transmitter 101a, a receiver 101b and a controller 101c which controls the transmitter 101a and the receiver 101b to transmit and receive the signals via the wireless access interface. The controller 101c may perform a function of controlling the allocation of communications resource elements of the wireless access interface and may in some examples include a scheduler for scheduling transmissions via the wireless access interface for both an uplink and a downlink. Correspondingly an example UE 104 is shown to include a transmitter 104a, a receiver 104b and a controller 104c, which controls the transmitter and the receiver of the UE in order to transmit and receive signals to the eNB 101 by the wireless access interface summarised in FIGS. 2 and 3.

According to the present technique the eNB 101 and the UE 104 are configured to respectively transmit and receive an adapted control message in the PDCCH 601 via a transmission represented as an arrow 602. The adapted control message 601 includes an identifier 604 which identifies one of a plurality of groups or sub-groups into which the UEs served by the eNB 101 have been divided. The adapted control message also provides an indication in a field 606 of communications resources of the shared channel on which a paging message or record is to be transmitted by the eNB 101.

Optionally, as according to the arrangements explained above, the UEs are divided into groups according to paging occasions 610. However, the present technique defines an arrangement in which a group of UEs using a particular paging occasion can be further divided into subgroups of UEs so that a UE can reduce power consumption by powering down its receiver when it knows that the paging message does not need to be received by that UE because the paging message is associated with a different group of UEs. According to the present technique therefore the paging group ID 604 provided in the control message 601 is used to identify one of the subgroups for that paging occasion and only the UEs within that subgroup need to proceed to the shared communication resources indicated by the control message to receive the paging message, which may identify one or more of the UEs within that subgroup.

As shown in FIG. 6 by an arrow 612, the eNB 101 transmits within the resources indicated by the control message 601 by the field 606, the paging message 614 which includes one or more identifiers within the group or subgroup of UEs identified by the paging group ID 604. Accordingly, if the UE then detects its identifier from the paging message then the UE can proceed to perform the random access procedure represented by an arrow 616 followed by the RRC connection setup 410 and the downlink data communication 412 according to a conventional operation.

As indicated above a Radio Network Temporary Identifier (RNTI) is used to identify a connected mode UE in the cell, or a specific radio channel. Types of RNTIs include:
- P-RNTI: Paging RNTI. Used for Paging Message.
- SI-RNTI: System Information RNTI. Used for transmission of SIB messages
- RA-RNTI: Random Access RNTI. Used for PRACH Response.
- C-RNTI: Cell RNTI. Used for the transmission to a specific UE after RACH.
- T-CRNTI: Temporary C-RNTI. Mainly used during RACH
- SPS-C-RNTI: Semi persistant Scheduling C-RNTI
- TPC-PUCCH-RNTI: Transmit Power Control-Physical Uplink Control Channel-RNTI
- TPC-PUSCH-RNTI: Transmit Power Control-Physical Uplink Shared Channel-RNTI
- M-RNTI: MBMS RNTI RNTI values are given in TS 36.321 section 7.1 ([6]). RNTI values are presented in Table 7.1-1 from [6] and their usage and associated Transport Channels and Logical Channels are presented in Table 7.1-2.

TABLE 1

RNTI values

| Value (hexadecimal) | RNTI |
| --- | --- |
| 0000 | N/A |
| 0001-003C | RA-RNTI, C-RNTI, Semi-Persistent Scheduling C-RNTI, Temporary C-RNTI, eIMTA-RNTI, TPC-PUCCH-RNTI, TPC-PUSCH-RNTI and SL-RNTI(see note) |
| 003D-FFF3 | C-RNTI, Semi-Persistent Scheduling C-RNTI, eIMTA-RNTI, Temporary C-RNTI, TPC-PUCCH-RNTI, TPC-PUSCH-RNTI and SL-RNTI |
| FFF4-FFFC | Reserved for future use |
| FFFD | M-RNTI |
| FFFE | P-RNTI |
| FFFF | SI-RNTI |

NOTE:
A MAC entity uses the sante C-RNTI on all Serving Cells.

TABLE 2

RNTI usage

| RNTI | Usage | Transport Channel | Logical Channel |
| --- | --- | --- | --- |
| P-RNTI | Paging and System Information change notification | PCH | PCCH |
| SI-RNTI | Broadcast of System Information | DL-SCH | BCCH |
| M-RNTI | MCCH Information change notification | N/A | N/A |
| RA-RNTI | Random Access Response | DL-SCH | N/A |
| eIMTA-RNTI | eIMTA TDD UL/DL configuration notification | N/A | N/A |
| Temporary C-RNTI | Contention Resolution (when no valid C-RNTI is available) | DL-SCH | CCCH |
| Temporary C-RNTI | Msg3 transmission | UL-SCH | CCCH, DCCH, DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |
| C-RNTI | Triggering of PDCCH ordered random access | N/A | N/A |
| Semi-Persistent Scheduling C-RNTI | Semi-Persistently scheduled unicast transmission (activation, reactivation and retransmission) | DL-SCH, UL-SCH | DCCH, DTCH |
| Semi-Persistent Scheduling C-RNTI | Semi-Persistently scheduled unicast transmission (deactivation) | N/A | N/A |

TABLE 2-continued

RNTI usage

| RNTI | Usage | Transport Channel | Logical Channel |
|---|---|---|---|
| TPC-PUCCH-RNTI | Physical layer Uplink power control | N/A | N/A |
| TPC-PUSCH-RNTI | Physical layer Uplink power control | N/A | N/A |
| SL-RNTI | Dynamically scheduled sidelink transmission | SL-SCH | STCH |

As can be seen from table I there are currently nine spare values that could potentially be used as identifiers for each of the sub-groups. Therefore in some examples embodiments at least some of these P-RNTI values could be used as sub-group identifiers to perform further grouping of devices, for example for NB-IOT.

The nine spare P-RNTI values identified above can be mapped on to the three "types" of UEs. The P-RNTI can be used instead of a separate message reading indicator to indicate for example which of three groups (including more than one of those groups) are addressed in the PCCH message.

In another example embodiment the UEs may be grouped in accordance with their identity. As indicated above, conventionally the UEs IMSI MOD 1024 is used to calculate the paging occasion. In order to further group the UEs a further digit, for example the $5^{th}$ digit may be used from the IMSI (where the first 4 digits are used in the mod function for the paging occasion) or use a hash function such as (IMSI MOD 4096)/1024 to form four groups. We would then use this to group UEs into one of a multiple of groups. For example, using the spare values a specific P-RNTI can be assigned to UEs with a $5^{th}$ digit or hash function of 0, 1 and another P-RNTI to UEs with a $5^{th}$ digit or hash function of 2, 3 and so on.

Depending how the groups are formed, the legacy P-RNTI value could be used to indicate that the paging record contains IDs from more than one group (so all UEs will check PDSCH in this instance), or slightly larger groups can be formed in order to indicate that, for example, a paging record contains IDs from groups 1 and 2, or group 3 only.

The paging message carried by the PDSCH is scheduled by a DCI. The DCI is typically carried by the PDCCH (or MPDCCH). The P-RNTI is masked to the CRC of the DCI and the UE would use the P-RNTI to unmask the CRC to determine whether the DCI exists or valid (schedules a PDSCH for paging message). In the current system with a single P-RNTI, the UE would perform a single blind decode using this P-RNTI at every paging occasion. If multiple P-RNTIs are used then the eNB would use one P-RNTI at a time since the UE decodes using one P-RNTI at a time. If the eNB needs to page two UEs that share the same paging occasion but belong to different groups (i.e. different P-RNTI), the eNB would have to page them at different occurrences of the paging occasion. The paging occasion can be very long for MTC devices. Hence in one embodiment, at least two P-RNTIs can be assigned to the UE, such that the UE can belong to two groups. For example, a global group and a local group using different P-RNTI can be assigned. All UEs belong to the global group whilst only specific UEs belong to the local group. When the eNB needs to page two UEs belonging to separate local groups, the eNB can use the global group to page both of them at the same time, thereby avoiding the delay of waiting for the next paging occasion. The UE however would need to monitor two P-RNTI instead of one. Since P-RNTI are performed at the CRC level where most of the decoding is done, the impact of performing this additional P-RNTI check may be therefore minimal.

Note that the above description (relating to decoding of a CRC scrambled with a P-RNTI) refers to one possible implementation of the MPDCCH decoding function. In another implementation of the CRC decoding function, one CRC decoding operation is performed to leave a residual value. The residual value is then compared to known residual values for the group and local P-RNTIs. If a match is observed by the UE, the UE would then decode the PDSCH carrying the paging record.

As will be appreciated, the more spare values that are used, the more groups that can be formed and hence the more we can reduce the amount of times a UE has to check the paging record. This does not completely avoid having to check sometimes, but the reduction can be significant when the amount of relative overhead paging is compared to the amount of actual times an individual UE is paged or needs to transmit some data.

Second Examples of an Improved Paging Technique

According to a further example embodiment of the present technique the UEs may grouped using a UE-ID or types and an identifier is used for each group with an indication of different communications resources in which a paging message for that group is to be transmitted. In one example the P-RNTI is set on the PDCCH and DCI indicates multiple regions of shared communications resources (PDSCH), which contains the paging message or record list, split into multiple blocks. Depending on the UE's group, the UE reads one of a multiple of smaller PDSCH resource allocations containing a subset of the entire paging record list.

In one example the shared channel resources for transmitting the paging message (PDCCH) call be signaled according to a conventional method. However, additional blocks of resource allocation may be determined by applying for example an additional subframe offset, and applied depending on UE group.

Figure 7:
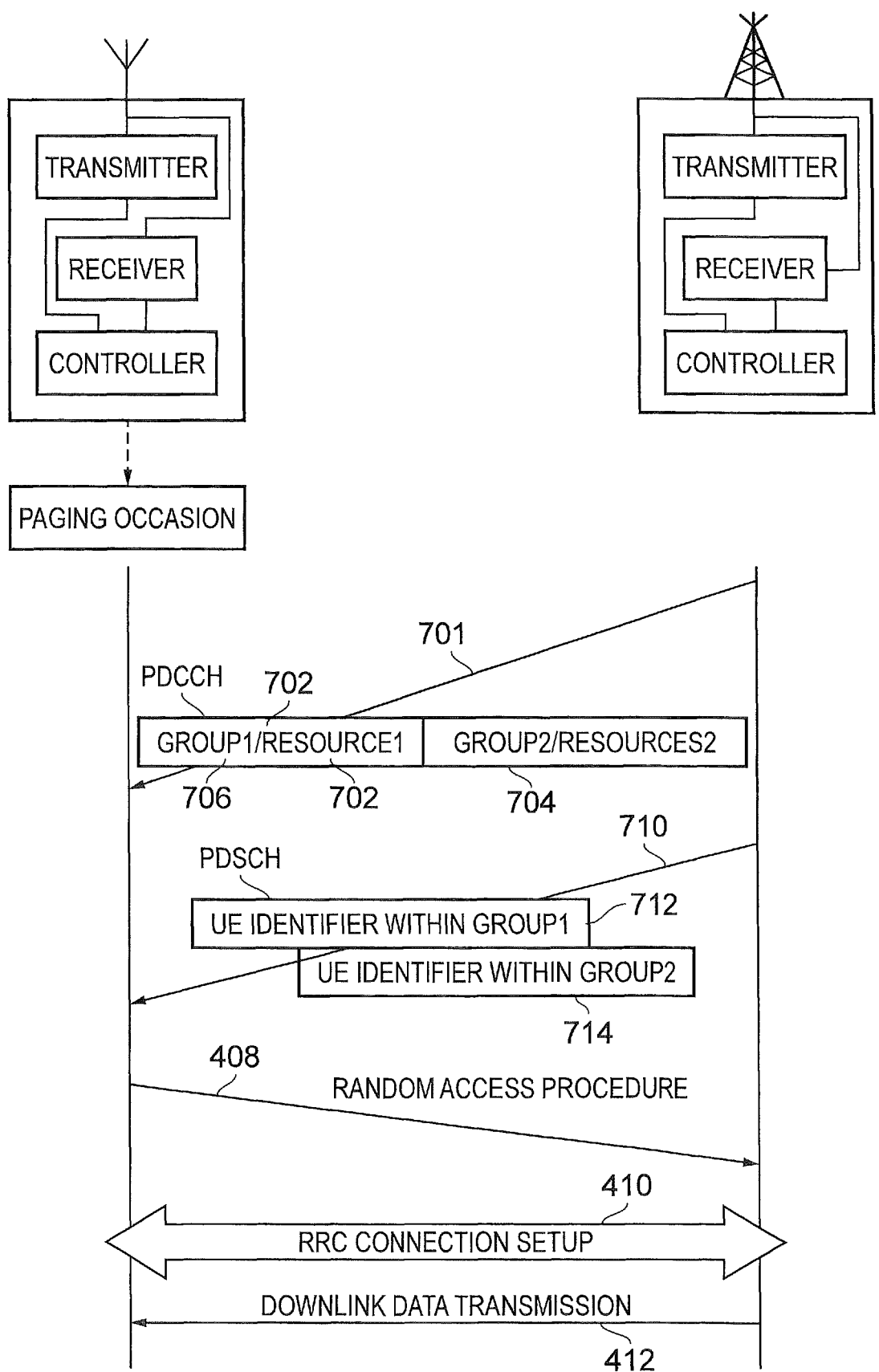
FIG. 7 is a representation of a message flow diagram and part block diagram illustrating an embodiment of a further aspect of the present technique in which communications devices may be paged differently depending on their group.

FIG. 7 provides a part schematic block diagram, part message flow diagram corresponding to that shown in FIG. 6 but adapted in accordance with the further aspect of the present technique. Since the example embodiment has common features and message transmissions as well as process steps to that shown in FIG. 6, only differences with respect to FIG. 7 will be applied although it will be appreciated that FIG. 7 relates to a different aspect.

Embodiments to the present technique can provide an arrangement in which UEs can be divided into groups which are arranged to receive different paging messages in different shared channel resources and indeed using different transmission techniques. As shown in FIG. 7 a control message transmitted on the PDCCH in for example a paging occasion for a group of UEs 701 includes a plurality of fields each of which contains a group identifier and an indication of the communications resources within which a paging message for that group will be transmitted on the PDSCH or other shared channel resources 702, 704. The example control message 702 shown in FIG. 7 provides only two fields for two groups of UEs indicating different resources for receiving the paging message. However, in other examples there may be more than two or any number of groups and therefore any number of fields identifying both the group and the resources of the downlink share channel where the paging message is to be transmitted. Correspondingly, therefore as shown in transmission of the paging message represented by an arrow 710, different paging messages are transmitted on the shared channel resources (PDSCH) using two communications resources 712, 714. Each of the different paging messages 712, 714 includes an identifier of the UE within the group which is being paged. Thereafter, the procedure continues as explained above with respect to a conventional arrangement with a random access procedure 408 followed by the RRC connection setup 410 and the downlink transmission 412.

Figure 8:
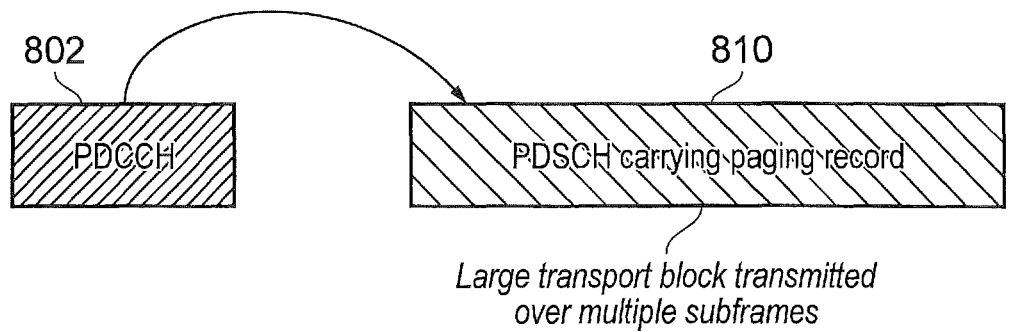
FIG. 8 is a schematic block diagram illustrating a conventional arrangement for paging communications devices.
Figure 9:
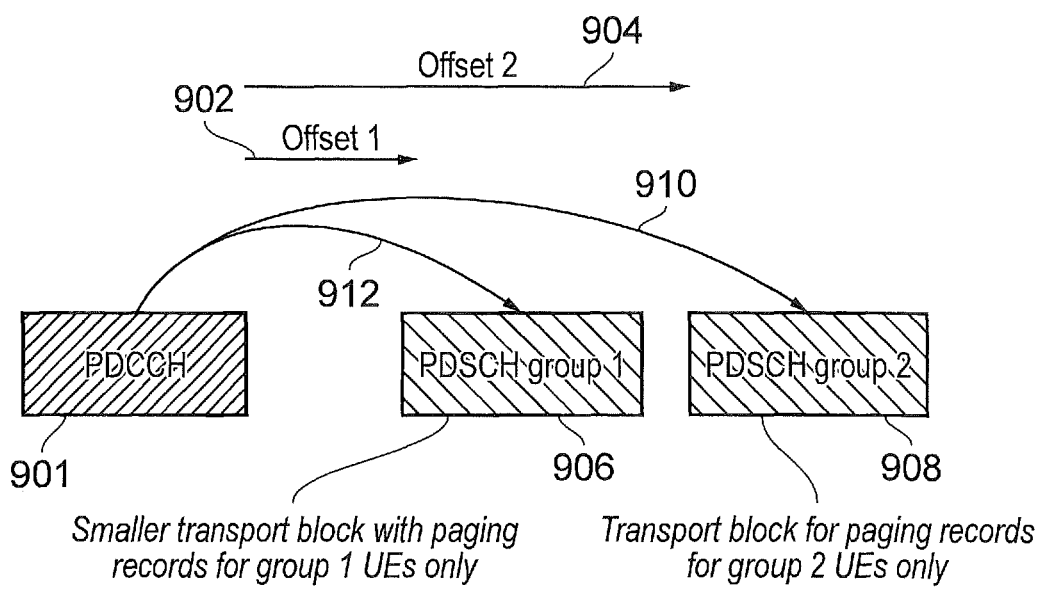
FIG. 9 is a schematic representation illustrating an arrangement in which different groups of communications devices may be configured to receive different paging messages in a paging occasion.

FIGS. 8 and 9 provide a further illustration of example embodiments of the present technique. FIG. 8 shows the transmission of the control message 702 on the PDCCH according to a conventional arrangement. The control message 702 indicates the communications resources of the shared channel (PDSCH) which will be carrying the paging message or paging record 810. For example, a PDCCH whose CRC is scrambled with the P-RNTI allocates PDSCH that contains a paging record. However as shown in FIG. 8, the size of the paging record is relatively large depending on the number of UEs which are being paged and the type of transmission being made. If there are many UEs to be paged, many UEs will be indicated in the paging record carried by the PDSCH. In this case, the PDSCH will occupy a lot of physical resource. The PDCCH may also indicate the physical resources, modulation coding scheme, transport block size etc. of the PDSCH carrying the paging record.

As will be appreciated therefore, all of the UEs for that paging occasion have to detect the control message from the control channel 822 and decode the paging message from the shared communications resources (PDSCH) 810 which carries the paging record. In some examples however if the paging message is to be received by for example a low cost communications device or a communications device which is located in a poor coverage area, then the communication on the shared channel of the paging message may be made repeatedly. If all communication devices in the group have to receive the paging message whereas only one of those of communications devices is being paged, then this will represent a significant power drain.

An example embodiment of the present technique is illustrated in FIG. 9. As explained above, according to the present technique the control message, transmitted to the UEs on the PDCCH illustrated in FIG. 9 as box 901, includes for each of a plurality of groups, identified by each group ID, an indication of the separate resources on which a paging message is to be transmitted for that group. As illustrated in FIG. 9 for the example shown, the control message transmitted in the PDCCH 901 has a pointer to the communications resources of the share communications channel (PDSCH) in which the paging message is to be transmitted in the subframe. Therefore as shown in FIG. 9 arrows 902, 904 represent an offset respectively to shared channel resources of the PDSCH for each group 906, 908. As represented by arrows 910, 912 each of the UEs within each group of UEs for group 1 and group 2 therefore receives an indication from the control message in the PDCCH 901, of an offset 902, 904 from the PDCCH 901. Each respective offset points respectively to a location of the shared channel resources 906, 908 from which the UE should recover the paging message for the UEs within that group. Accordingly, the UEs may be separated into different groups to receive different paging messages which correspond for example to different types of UEs. Thus according to the present technique, paging of UEs may be divided into different groups depending on the type of device such as smart meters, medical devices or smart phones. Furthermore, the transmission of the respective paging message in the respective communications resources for that group can be tailored to the type of UE. For example, if one of the groups is for low cost UEs, then the transmission of the paging message within the associated communications resources can be done repeatedly in order to extend the coverage of a cell formed by the eNodeB. In contrast if a conventional UE is in good radio coverage then these UEs may be grouped to receive the paging message as a single transmission in a smaller amount of communications resources. According to some example embodiments, the offsets can be configured as follows:

Offset of the groups is signaled in PDCCH
Offset of the groups is signaled via RRC signaling
   in a unicast manner when UEs are assigned to groups, or
   via SIB signaling (SIB may define the linkage between groups and offsets)
Offset of the group is defined in the spec
   E.g. The spec contains a table that maps group IDs to offsets. An example is shown in the table below:

| Group ID | Offset |
| --- | --- |
| 1 | 1 |
| 2 | 2 |
| 3 | 6 |

Offset of the group depends on the repetition level applied to UEs in that group. When the UE knows all the possible repetition levels that could be applied and it also knows which repetition level it has been assigned to, it can infer the offset. E.g.
   group 1 UEs are in normal coverage and have an offset of 1 from PDCCH
   group 2 UEs require 4 times repetition and have an offset of 1+1 (offset of group 1 UEs+number of repetitions for group 1 UEs)
   group 3 UEs require 16 times repetition and have an offset of 1+1+4

Figure 10:
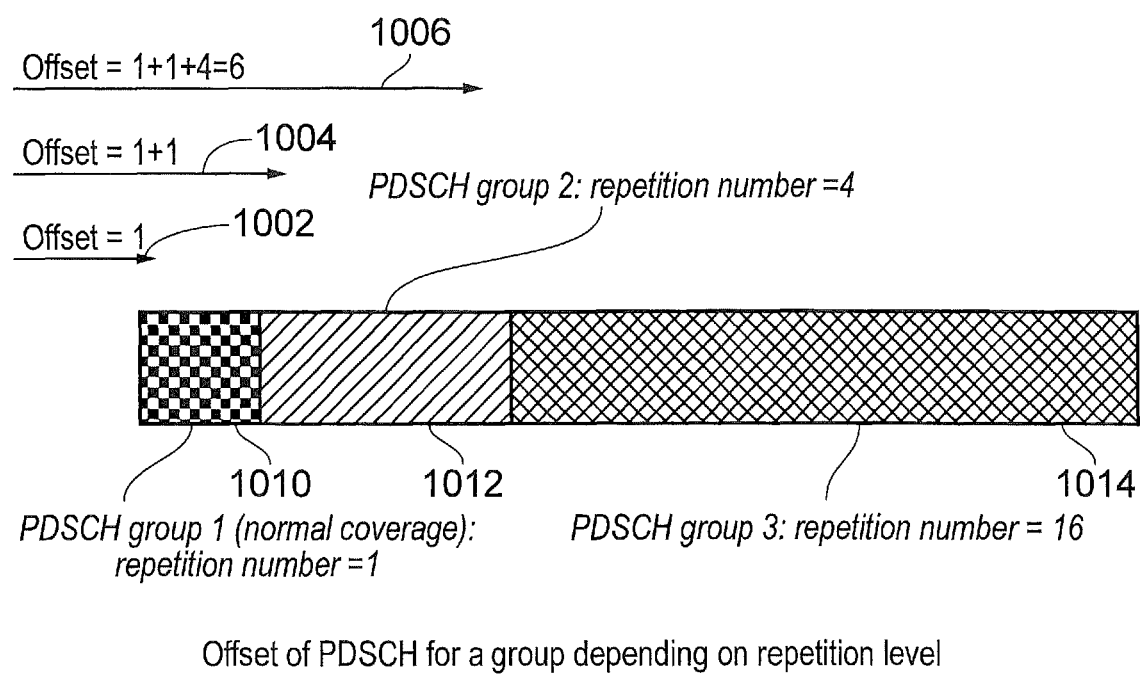
FIG. 10 is a schematic representation of different resources of a shared communications channel, identified by different offsets from a control message transmission, in which different paging messages are repeatedly transmitted a different number of times according to the present technique.

FIG. 10 provides a schematic illustration showing a different offset from the PDCCH transmission of the control message for different groups. For this example embodiment FIG. 10 shows the PDCCH indicating different subframe offsets for the PDSCH groups. The PDCCH can also indicate other per-group attributes of the PDSCH, such as the frequency or code-domain location of the PDSCH (e.g. for the case where the multiple narrowbands are defined). As shown in FIG. 10, each of three offsets 1002, 1004, 1006 are indicated in the PDCCH from the PDCCH transmission. The PDSCH transmissions for the three groups are shown as different shaded boxes 1010, 1012, 1014. In addition to the physical location of the PDSCH (e.g. subframe offset), other attributes of the PDSCH can be derived by UEs from the PDCCH based on e.g. their Group ID. For example:
   UEs in group 1 interpret the PDSCH to have no repetition coding applied
   UEs in group 2 interpret the PDSCH to have 4 times repetition coding applied
   UEs in group 3 interpret the PDSCH to have 16 times repetition coding applied
The attributes related to group ID (e.g. subframe offset, frequency offset, repetition number, modulation scheme) can be:
   signaled to the UE by RRC
      unicast
      SIB signaling
   defined in spec, related to the group ID Embodiments of the present technique can therefore provide an arrangement in which the UEs only need to wake up when the PDSCH of their group is active. This aspect saves on UE power consumption. In addition a single PDCCH can allocate the paging records for the different PDSCH groups. This aspect saves on over-the-air resource usage. Furthermore, UE groups may be formed based on the coverage level, in order that the paging message intended for the group not requiring coverage enhancement may be transmitted without (or with less) repetition, hence requiring less resources, than the group which does require coverage enhancement. This aspect saves on UE power consumption.

Various further aspects and features of the present invention are defined in the following numbered paragraphs:

Paragraph 1. An infrastructure equipment for transmitting data to or receiving data from one or more communications devices in a wireless communications network, the infrastructure equipment comprising:
   a transmitter configured to transmit signals to the one or more communications devices via a wireless access interface,
   a receiver configured to receive signals from one or more of the communications devices via the wireless access interface, the wireless access interface providing communications resources arranged in time divided units of a carrier frequency bandwidth, and including on the downlink in the time divided units a control channel for transmitting control channel messages to the communications devices and a shared channel providing communications resources for allocation to the communications devices to receive data on the downlink, and a controller configured with the receiver and transmitter
   when data is to be transmitted to a communications device, to transmit a control message providing an indication that the infrastructure equipment intends to transmit a paging message to the communications device, and providing an indication of communications resource of the shared channel on which the paging message is to be transmitted,
   to transmit the paging message to the communications device, the paging message including an indication that the communications device should establish a connection with the infrastructure equipment to receive the data from the infrastructure equipment, wherein the communications device is one of a group of communications devices configured to receive the control message when the infrastructure equipment transmits the control message, and the group of communications devices is sub-divided into sub-groups of communications devices and the control message is adapted to include an indication of one of the sub-groups which includes the communications device which should receive the paging message to be transmitted in the communications resources of the shared channel identified by the control message.

Paragraph 2. An infrastructure equipment according to paragraph 1, wherein each of the sub-groups of communications devices comprises communications devices of a different type.

Paragraph 3. An infrastructure equipment according to paragraph 2, wherein each of the different types of the sub-groups of communications devices represents a different capability of at least one of a receiver or a transmitter of the communications device to receive signals from the infrastructure equipment.

Paragraph 4. An infrastructure equipment according to paragraph 2, wherein each of the different types of the sub-groups of communications devices represents different radio conditions currently experienced by the communications device to receive signals from the infrastructure equipment.

Paragraph 5. An infrastructure equipment according to paragraph 2, wherein each of the different types of the sub-groups of communications devices represents a different characteristic of data to be communicated to the communications device.

Paragraph 6. An infrastructure equipment according to paragraph 2, wherein each of the different types of the sub-groups of communications devices represents a different locations of the communications devices within a cell formed by the infrastructure equipment.

Paragraph 7. An infrastructure equipment according to any of paragraphs 1 to 6, wherein the indication of the sub-groups which is to receive the paging message includes a paging identifier for the sub-group allocated by the infrastructure equipment.

Paragraph 8. An infrastructure equipment according to any of paragraphs 1 to 6, wherein each of the sub-groups are determined in accordance with a unique identifier allocated to each of the communications devices.

Paragraph 9. An infrastructure equipment according to any of paragraphs 1 to 7, wherein one or more of the communications devices is included in more than one of the sub-groups, the one or more communications devices being assigned more than one paging identifier for the more than one sub-groups.

Paragraph 10. An infrastructure equipment according to any of paragraphs 1 to 9, wherein the indication of one of the sub-groups which is to receive the paging message is a Paging-Radio Network Temporary Identifier.

Paragraph 11. An infrastructure equipment according to any of paragraphs 1 to 10, wherein the group of communications devices to which the control message is transmitted is one of a plurality of groups of communications devices, each of the groups being configured to receive a corresponding control message transmitted by the transmitter at a different time forming a different paging occasion.

Paragraph 12. An infrastructure equipment according to any of paragraphs 1 to 7, wherein the paging message includes an indication of a list comprising the communications device or one or more other communications devices which are to receive data from the infrastructure equipment.

Paragraph 13. A method of transmitting data from an infrastructure equipment of a wireless communications network to a communications device, the method comprising
   when data is to be transmitted to the communications device, transmitting a control message via a wireless access interface provided by the infrastructure equipment, the wireless access interface providing communications resources arranged in time divided units of a carrier frequency bandwidth, and including on the downlink in the time divided units a control channel for transmitting control channel messages to the communications devices and a shared channel providing communications resources for allocation to the communications devices to receive data on the downlink, and providing an indication of communications resource of the shared channel on which the paging message is to be transmitted, transmitting the paging message to the communications device, the paging message including an indication that the communications device should establish a connection with the infrastructure equipment to receive the data from the infrastructure equipment, wherein the communications device is one of a group of communications devices configured to receive the control message when the infrastructure equipment transmits the control message, and the group of communications devices is sub-divided into sub-groups of communications devices and the control message is adapted to include an indication of one of the sub-groups which includes the communications device which should receive the paging message to be transmitted in the communications resources of the shared channel identified by the control message.

Paragraph 14. A communications device for transmitting data to or receiving data from a wireless communications network, the communications device comprising a transmitter configured to transmit signals to one or more infrastructure equipment of the wireless communications network via a wireless access interface, a receiver configured to receive signals from one or more of the infrastructure equipment of the wireless communications network via the wireless access interface, the wireless access interface providing communications resources arranged in time divided units of a carrier frequency bandwidth providing a plurality of blocks of communications resources, and including on the downlink in the time divided units a control channel for receiving control channel messages from the infrastructure equipment and a shared channel providing communications resources for allocation to the communications device to receive data on the downlink and a controller configured with the receiver and transmitter to receive a control message providing an indication that the infrastructure equipment intends to transmit a paging message to a group of communications devices which includes the communications device, and providing an indication of communications resource of the shared channel on which the paging message is to be received, and to receive the paging message from the infrastructure equipment, the paging message including an indication that the communications device should establish a connection with the infrastructure equipment to receive the data from the infrastructure equipment, wherein the group of communications devices is sub-divided into sub-groups of communications devices and the control message is adapted to include an indication of one of the sub-groups which includes the communications device which should receive the paging message to be transmitted in the communications resources of the shared channel identified by the control message.

Paragraph 15. A communications device according to paragraph 14, wherein the each of the sub-groups of communications devices comprises communications devices of a different type.

Paragraph 16. A communications device according to paragraph 15, wherein the each of the different types of the sub-groups of communications devices represents a different capability of at least one of a receiver or a transmitter of the communications device to receive signals from the infrastructure equipment.

Paragraph 17. A communications device according to paragraph 15, wherein the each of the different types of the sub-groups of communications devices represents a different radio conditions currently experienced by the communications device to receive signals from the infrastructure equipment.

Paragraph 18. A communications device according to paragraph 15, wherein the each of the different types of the sub-groups of communications devices represents a different characteristic of data to be communicated to the communications device.

Paragraph 19. A communications device according to paragraph 15, wherein the each of the different types of the sub-groups of communications devices represents a different locations of the communications devices within a cell formed by the infrastructure equipment.

Paragraph 20. A communications device according to any of paragraphs 15 to 19, wherein the group of communications devices to which the control message is transmitted is one of a plurality of groups of communications devices, each of the groups being configured to receive a corresponding control message transmitted by the transmitter at a different time forming a different paging occasion.

Paragraph 21. A communications device according to any of paragraphs 14 to 20, wherein the paging message includes an indication of the communications device or one or more other communications devices which are to receive data from the infrastructure equipment.

Paragraph 22. A communications device according to any of paragraphs 14 to 21, wherein the indication of the sub-groups which is to receive the paging message includes a paging identifier for the sub-group allocated by the infrastructure equipment.

Paragraph 23. A communications device according to any of paragraphs 14 to 22, wherein each of the sub-groups are determined in accordance with a unique identifier allocated to each of the communications devices.

Paragraph 24. A communications device according to any of paragraphs 14 to 23, wherein the communications device is included in more than one of the sub-groups, the communications device being assigned more than one paging identifier for the more than one sub-groups.

Paragraph 25. A communications device according to any of paragraphs 14 to 24, wherein the indication of one of the sub-groups which is to receive the paging message is a Paging-Radio Network Temporary Identifier.

Paragraph 26. A method of receiving data from an infrastructure equipment of a wireless communications network at a communications device, the method comprising receiving a control message transmitted via a wireless access interface provided by the infrastructure equipment, the wireless access interface providing communications resources arranged in time divided units of a carrier frequency bandwidth, and including on the downlink in the time divided units a control channel for transmitting control channel messages to the communications devices and a shared channel providing communications resources for allocation to the communications devices to receive data on the downlink, and providing an indication of communications resource of the shared channel on which the paging message is to be transmitted, receiving the paging message, the paging message including an indication that the communications device should establish a connection with the infrastructure equipment to receive the data from the infrastructure equipment, wherein the communications device is one of a group of communications devices configured to receive the control message when the infrastructure equipment transmits the control message, and the group of communications devices is sub-divided into sub-groups of communications devices and the control message is adapted to include an indication of one of the sub-groups which includes the communications device which should receive the paging message to be transmitted in the communications resources of the shared channel identified by the control message.

Paragraph 27. An infrastructure equipment for transmitting data to or receiving data from one or more communications devices in a wireless communications network, the infrastructure equipment comprising:

a transmitter configured to transmit signals to the one or more communications devices via a wireless access interface, a receiver configured to receive signals from one or more of the communications devices via the wireless access interface, the wireless access interface providing communications resources arranged in time divided units of a carrier frequency bandwidth, and including on the downlink in the time divided units a control channel for transmitting control channel messages to the communications devices and a shared channel providing communications resources for allocation to the communications devices to receive data on the downlink, and a controller configured with the receiver and transmitter when data is to be transmitted to a communications device, to transmit a control message providing an indication that the infrastructure equipment intends to transmit a paging message to the communications device, and providing an indication of communications resource of the shared channel on which the paging message is to be transmitted, to transmit the paging message to the communications device, the paging message including an indication that the communications device should establish a connection with the infrastructure equipment to receive the data from the infrastructure equipment, wherein the communications device is one of a group of communications devices configured to receive the control message when the infrastructure equipment transmits the control message, and the group of communications devices is sub-divided into sub-groups of communications devices and each of a plurality of the sub-groups is configured to identify from the control message an indication of different communications resources of the shared channel in which a different paging message is to be transmitted for reception by the communications devices in the sub-group of the communications devices, each of the paging message identifying one or more communications devices of the sub-group which are to receive data from the infrastructure equipment on the downlink.

Paragraph 28. An infrastructure equipment according to paragraph 27, wherein the controller is configured with the transmitter
to transmit each of the paging messages in the different communications resources of the shared channel a different number of times.

Paragraph 29. An infrastructure equipment according to paragraph 27 or 28, wherein the control message indicates the communications resources in which the paging message will be transmitted for each sub-group of communications devices as a offset in one or more of time or frequency from the transmission of the control message, the offset being different for each sub-group.

Paragraph 30. An infrastructure equipment according to paragraph 27, 28 or 29, wherein the each of the sub-groups of communications devices comprises communications devices of a different type.

Paragraph 31. An infrastructure equipment according to paragraph 30, wherein the each of the a different types of the sub-groups of communications devices represents a different capability of a at least one of a transmitter or a receiver of the communications device to receive signals from the infrastructure equipment.

Paragraph 32. An infrastructure equipment according to paragraph 30, wherein the each of the different types of the sub-groups of communications devices represents a different radio conditions currently experienced by the communications device to receive signals from the infrastructure equipment.

Paragraph 33. An infrastructure equipment according to paragraph 30, wherein the each of the different types of the sub-groups of communications devices represents a different characteristic of data to be communicated to the communications device.

Paragraph 34. An infrastructure equipment according to paragraph 30, wherein the each of the different types of the sub-groups of communications devices represents a different locations of the communications devices within a cell formed by the infrastructure equipment.

Paragraph 35. An infrastructure equipment according to any of paragraphs 27 to 34, wherein the indication of the sub-groups which is to receive the paging message includes a paging identifier for the sub-group allocated by the infrastructure equipment.

Paragraph 36. An infrastructure equipment according to any of paragraphs 27 to 35, wherein each of the sub-groups are determined in accordance with a unique identifier allocated to each of the communications devices.

Paragraph 37. An infrastructure equipment according to any of paragraphs 27 to 36, wherein one or more of the communications devices is included in more than one of the sub-groups, the one or more communications devices being assigned more than one paging identifier for the more than one sub-groups.

Paragraph 38. An infrastructure equipment according to any of paragraphs 27 to 37, wherein the indication of one of the sub-groups which is to receive the paging message is a Paging-Radio Network Temporary Identifier.

Paragraph 39. A method of transmitting data from an infrastructure equipment of a wireless communications network to a communications device, the method comprising
when data is to be transmitted to the communications device, transmitting a control message via a wireless access interface provided by the infrastructure equipment, the wireless access interface providing communications resources arranged in time divided units of a carrier frequency bandwidth, and including on the downlink in the time divided units a control channel for transmitting control channel messages to the communications devices and a shared channel providing communications resources for allocation to the communications devices to receive data on the downlink, and providing an indication of communications resource of the shared channel on which the paging message is to be transmitted, transmitting the paging message to the communications device, the paging message including an indication that the communications device should establish a connection with the infrastructure equipment to receive the data from the infrastructure equipment, wherein the communications device is one of a group of communications devices configured to receive the control message when the infrastructure equipment transmits the control message, and the group of communications devices is sub-divided into sub-groups of communications devices and each of a plurality of the sub-groups is configured to identify from the control message an indication of different communications resources of the shared channel in which a different paging message is to be transmitted for reception by the communications devices in the sub-group of the communications devices, each of the paging messages identifying one or more communications devices of the sub-group which are to receive data from the infrastructure equipment on the downlink.

Paragraph 40. A communications device for transmitting data to or receiving data from a wireless communications network, the communications device comprising a transmitter configured to transmit signals to one or more infrastructure equipment of the wireless communications network via a wireless access interface, a receiver configured to receive signals from one or more of the infrastructure equipment of the wireless communications network via the wireless access interface, the wireless access interface providing communications resources arranged in time divided units of a carrier frequency bandwidth, and including on the downlink in the time divided units a control channel for receiving control channel messages from the infrastructure equipment and a shared channel providing communications resources for allocation to the communications device to receive data on the downlink, and a controller configured with the receiver and transmitter to receive a control message providing an indication that the infrastructure equipment intends to transmit a paging message to a group of communications devices which includes the communications device, and providing an indication of communications resource of the shared channel on which the paging message is to be received, and to receive the paging message from the infrastructure equipment, the paging message including an indication that the communications device should establish a connection with the infrastructure equipment to receive the data from the infrastructure equipment, wherein the communications device is one of a group of communications devices configured to receive the control message when the infrastructure equipment transmits the control message, and the group of communications devices is sub-divided into sub-groups of communications devices and each of a plurality of the sub-groups is configured to identify from the control message an indication of different communications resources of the shared channel in which different paging messages are to be transmitted for reception by the communications devices in the sub-group of the communications devices, the paging message received by the receiver identifying the communications device in the sub-group which is to receive data from the infrastructure equipment on the downlink.

Paragraph 41. A communications device according to paragraph 40, wherein each of the paging messages in the different communications resources of the shared channel is transmitted a different number of times, and the controller is configured with the receiver to receive the paging message for the sub-group which the communications device forms part in the different communications resources of the shared channel a repeatedly a different number of times compared to at least one of the other paging messages transmitted in the other communications resources of the shared channel.

Paragraph 42. A communications device according to paragraph 40 or 41, wherein the control message indicates the communications resources in which the paging message will be transmitted for each sub-group of communications devices as a offset in one or more of time or frequency from the transmission of the control message, the offset being different for each sub-group.

Paragraph 43. A communications device according to any of paragraphs 40 to 42, wherein the each of the sub-groups of communications devices comprises communications devices of a different type.

Paragraph 44. A communications device according to paragraph 43, wherein the each of the different types of the sub-groups of communications devices represents a different capability of at least one of a receiver or a transmitter of the communications device to receive signals from the infrastructure equipment.

Paragraph 45. A communications device according to paragraph 43, wherein the each of the different types of the sub-groups of communications devices represents a different radio conditions currently experienced by the communications device to receive signals from the infrastructure equipment.

Paragraph 46. A communications device according to paragraph 43, wherein the each of the different types of the sub-groups of communications devices represents a different characteristic of data to be communicated to the communications device.

Paragraph 47. A communications device according to paragraph 43, wherein the each of the different types of the sub-groups of communications devices represents a different locations of the communications devices within a cell formed by the infrastructure equipment.

Paragraph 48. A communications device according to any of paragraphs 40 to 47, wherein the indication of the sub-groups which is to receive the paging message includes a paging identifier for the sub-group allocated by the infrastructure equipment.

Paragraph 49. A communications device according to any of paragraphs 40 to 48, wherein each of the sub-groups are determined in accordance with a unique identifier allocated to each of the communications devices.

Paragraph 50. A communications device according to any of paragraphs 40 to 49, wherein the communications device is included in more than one of the sub-groups, the communications device being assigned more than one paging identifier for the more than one sub-groups.

Paragraph 51. A communications device according to any of paragraphs 40 to 50, wherein the indication of one of the sub-groups which is to receive the paging message is a Paging-Radio Network Temporary Identifier.

Paragraph 52. A method of receiving data from an infrastructure equipment of a wireless communications network at a communications device, the method comprising
  receiving a control message transmitted via a wireless access interface provided by the infrastructure equipment, the wireless access interface providing communications resources arranged in time divided units of a carrier frequency bandwidth, and including on the downlink in the time divided units a control channel for transmitting control channel messages to the communications devices and a shared channel providing communications resources for allocation to the communications devices to receive data on the downlink, and providing an indication of communications resource of the shared channel on which the paging message is to be transmitted,
  receiving the paging message, the paging message including an indication that the communications device should establish a connection with the infrastructure equipment to receive the data from the infrastructure equipment, wherein the communications device is one of a group of communications devices configured to receive the control message when the infrastructure equipment transmits the control message, and the group of communications devices is sub-divided into sub-groups of communications devices, and each of a plurality of the sub-groups is configured to identify from the control message an indication of different communications resources of the shared channel in which different paging messages are to be transmitted for reception by the communications devices in the sub-group of the communications devices, the paging message received by the receiver identifying the communications device in the sub-group which is to receive data from the infrastructure equipment on the downlink.

Paragraph 53. A wireless communications system comprising an infrastructure equipment according to paragraphs 1 or 27 and a communications device according to paragraph 14 or 40.

REFERENCES

[1] LTE for UMTS: OFDMA and SC-TDMA Based Radio Access, Harris Holma and Antti Toskala, Wiley 2009, ISBN 978-0-470-99401-6.

[2] http://Itemwireless.blogspot.co.uk/2012/12/paging-in-lte-html

[3] 3GPP TS 36.304

[4] RP-151621, NarrowBand IOT (NB-IOT) Qualcomm Incorporated

[5] R2-154507, NB-IOT—Design of Message Reading Indicator—Huawei, HiSilicon

[6] 3GPP TS 36.321

Annex 1:

As shown in FIG. 4, each LTE uplink sub-frame may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the eNB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signaled to UE in downlink signaling such as system information blocks. As well as physical uplink channels, uplink sub-frames may also include reference signals. For example, demodulation reference signals (DMRS) 307 and sounding reference signals (SRS) 308 may be present in an uplink sub-frame where the DMRS occupy the fourth symbol of a slot in which PUSCH is transmitted and are used for decoding of PUCCH and PUSCH data, and where SRS are used for uplink channel estimation at the eNB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [1].

In an analogous manner to the resources of the PDSCH, resources of the PUSCH are required to be scheduled or granted by the serving eNB and thus if data is to be transmitted by a UE, resources of the PUSCH are required to be granted to the UE by the eNB. At a UE, PUSCH resource allocation is achieved by the transmission of a scheduling request or a buffer status report to its serving eNB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNB and gives the eNB information regarding the amount of data in an uplink buffer or buffers at the UE. After receiving the buffer status report, the eNB can allocate a portion of the PUSCH resources to the sending UE in order to transmit some of its buffered uplink data and then inform the UE of the resource allocation via a DCI in the PDCCH. For example, presuming a UE has a connection with the eNB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 309 and lower 310 subcarriers/frequencies/resource blocks of an uplink sub-frame are reserved for control signaling rather than the initial symbols of a downlink sub-frame. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made contiguous frequency allocations for each UE are preferable.

The invention claimed is:

1. An infrastructure equipment for transmitting data to or receiving data from one or more communications devices in a wireless communications network, the infrastructure equipment comprising:
a transmitter configured to transmit signals to the one or more communications devices via a wireless access interface,
a receiver configured to receive signals from one or more of the communications devices via the wireless access interface, the wireless access interface providing communications resources arranged in time divided units of a carrier frequency bandwidth, and including on the downlink in the time divided units a control channel for transmitting control channel messages to the communications devices and a shared channel providing communications resources for allocation to the communications devices to receive data on the downlink, and a controller configured with the receiver and transmitter
when data is to be transmitted to a communications device, to transmit a control message providing an indication that the infrastructure equipment intends to transmit a paging message to the communications device, and providing an indication of communications resource of the shared channel on which the paging message is to be transmitted,
to transmit the paging message to the communications device, the paging message including an indication that the communications device should establish a connection with the infrastructure equipment to receive the data from the infrastructure equipment, wherein the communications device is one of a group of communications devices configured to receive the control message when the infrastructure equipment transmits the control message, and the group of communications devices is sub-divided into sub-groups of communications devices and the control message is adapted to include an indication of one of the sub-groups which includes the communications device which should receive the paging message to be transmitted in the communications resources of the shared channel identified by the control message,
wherein the group of communications devices to which the control message is transmitted is one of a plurality of groups of communications devices, each of the groups being configured to receive a corresponding control message transmitted by the transmitter at a different time forming a different paging occasion,
wherein each of the paging messages in the different communications resources of the shared channel is transmitted a different number of times, and the controller is configured with the transmitter
to transmit, repeatedly a different number of times, the paging message for the sub-group which the communications device forms a part of in the different communications resources of the shared channel, compared to at least one of the other paging messages transmitted in the other communications resources of the shared channel.

2. A communications device for transmitting data to or receiving data from a wireless communications network, the communications device comprising a transmitter configured to transmit signals to one or more infrastructure equipment of the wireless communications network via a wireless access interface,
a receiver configured to receive signals from one or more of the infrastructure equipment of the wireless communications network via the wireless access interface, the wireless access interface providing communications resources arranged in time divided units of a carrier frequency bandwidth providing a plurality of blocks of communications resources, and including on the downlink in the time divided units a control channel for receiving control channel messages from the infrastructure equipment and a shared channel providing communications resources for allocation to the communications device to receive data on the downlink, and a controller configured with the receiver and transmitter
to receive a control message providing an indication that the infrastructure equipment intends to transmit a paging message to a group of communications devices which includes the communications device, and providing an indication of communications resource of the shared channel on which the paging message is to be received, and
to receive the paging message from the infrastructure equipment, the paging message including an indication that the communications device should establish a connection with the infrastructure equipment to receive the data from the infrastructure equipment, wherein the group of communications devices is sub-divided into sub-groups of communications devices and the control message is adapted to include an indication of one of the sub-groups which includes the communications device which should receive the paging message to be transmitted in the communications resources of the shared channel identified by the control message,
wherein the group of communications devices to which the control message is transmitted is one of a plurality of groups of communications devices, each of the groups being configured to receive a corresponding control message transmitted by the transmitter at a different time forming a different paging occasion, and
wherein each of the paging messages in the different communications resources of the shared channel is transmitted a different number of times, and the controller is configured with the receiver
to receive, repeatedly a different number of times, the paging message for the sub-group which the communications device forms a part of in the different communications resources of the shared channel, compared to at least one of the other paging messages transmitted in the other communications resources of the shared channel.

3. The communications device as claimed in claim 2, wherein the each of the sub-groups of communications devices comprises communications devices of a different type.

4. The communications device as claimed in claim 3, wherein the each of the different types of the sub-groups of communications devices represents a different capability of at least one of a receiver or a transmitter of the communications device to receive signals from the infrastructure equipment.

5. The communications device as claimed in claim 3, wherein the each of the different types of the sub-groups of communications devices represents a different radio conditions currently experienced by the communications device to receive signals from the infrastructure equipment.

6. The communications device as claimed in claim 3, wherein the each of the different types of the sub-groups of communications devices represents a different characteristic of data to be communicated to the communications device.

7. The communications device as claimed in claim 3, wherein the each of the different types of the sub-groups of communications devices represents different locations of the communications devices within a cell formed by the infrastructure equipment.

8. The communications device as claimed in claim 2, wherein the paging message includes an indication of the communications device or one or more other communications devices which are to receive data from the infrastructure equipment.

9. The communications device as claimed in claim 2, wherein the indication of the sub-groups which is to receive the paging message includes a paging identifier for the sub-group allocated by the infrastructure equipment.

10. The communications device as claimed in claim 2, wherein each of the sub-groups are determined in accordance with a unique identifier allocated to each of the communications devices.

11. The communications device as claimed in claim 2, wherein the communications device is included in more than one of the sub-groups, the communications device being assigned more than one paging identifier for the more than one sub-groups.

12. The communications device as claimed in claim 2, wherein the indication of one of the sub-groups which is to receive the paging message is a Paging-Radio Network Temporary Identifier.

13. A communications device for transmitting data to or receiving data from a wireless communications network, the communications device comprising
   a transmitter configured to transmit signals to one or more infrastructure equipment of the wireless communications network via a wireless access interface,
   a receiver configured to receive signals from one or more of the infrastructure equipment of the wireless communications network via the wireless access interface, the wireless access interface providing communications resources arranged in time divided units of a carrier frequency bandwidth, and including on the downlink in the time divided units a control channel for receiving control channel messages from the infrastructure equipment and a shared channel providing communications resources for allocation to the communications device to receive data on the downlink, and a controller configured with the receiver and transmitter
   to receive a control message providing an indication that the infrastructure equipment intends to transmit a paging message to a group of communications devices which includes the communications device, and providing an indication of communications resource of the shared channel on which the paging message is to be received, and
   to receive the paging message from the infrastructure equipment, the paging message including an indication that the communications device should establish a connection with the infrastructure equipment to receive the data from the infrastructure equipment, wherein the communications device is one of a group of communications devices configured to receive the control message when the infrastructure equipment transmits the control message, and the group of communications devices is sub-divided into sub-groups of communications devices and each of a plurality of the sub-groups is configured to identify from the control message an indication of different communications resources of the shared channel in which different paging messages are to be transmitted for reception by the communications devices in the sub-group of the communications devices, the paging message received by the receiver identifying the communications device in the sub-group which is to receive data from the infrastructure equipment on the downlink,
   wherein the group of communications devices to which the control message is transmitted is one of a plurality of groups of communications devices, each of the groups being configured to receive a corresponding control message transmitted by the transmitter at a different time forming a different paging occasion, and
   wherein each of the paging messages in the different communications resources of the shared channel is transmitted a different number of times, and the controller is configured with the receiver
   to receive, repeatedly a different number of times, the paging message for the sub-group which the communications device forms a part of in the different communications resources of the shared channel, compared to at least one of the other paging messages transmitted in the other communications resources of the shared channel.

14. The communications device as claimed in claim 13, wherein the control message indicates the communications resources in which the paging message will be transmitted for each sub-group of communications devices as an offset in one or more of time or frequency from the transmission of the control message, the offset being different for each sub-group.

15. The communications device as claimed in claim 13, wherein the each of the sub-groups of communications devices comprises communications devices of a different type.

16. The communications device as claimed in claim 15, wherein the each of the different types of the sub-groups of communications devices represents a different capability of at least one of a receiver or a transmitter of the communications device to receive signals from the infrastructure equipment.

17. The communications device as claimed in claim 15, wherein the each of the different types of the sub-groups of communications devices represents different radio conditions currently experienced by the communications device to receive signals from the infrastructure equipment.

18. The communications device as claimed in claim 15, wherein the each of the different types of the sub-groups of communications devices represents a different characteristic of data to be communicated to the communications device.

19. The communications device as claimed in claim 15, wherein the each of the different types of the sub-groups of communications devices represents different locations of the communications devices within a cell formed by the infrastructure equipment.

20. The communications device as claimed in claim 13, wherein the indication of the sub-groups which is to receive the paging message includes a paging identifier for the sub-group allocated by the infrastructure equipment.

21. The communications device as claimed in claim 13, wherein each of the sub-groups are determined in accordance with a unique identifier allocated to each of the communications devices.

22. The communications device as claimed in claim 13, wherein the communications device is included in more than one of the sub-groups, the communications device being assigned more than one paging identifier for the more than one sub-groups.

23. The communications device as claimed in claim 13, wherein the indication of one of the sub-groups which is to receive the paging message is a Paging-Radio Network Temporary Identifier.

* * * * *